(No Model.)

H. IRELAND.
FOOD HOLDER FOR BIRD CAGES.

No. 270,071. Patented Jan. 2, 1883.

WITNESSES:
James F. Tobin
David Williams

INVENTOR:
Howard Ireland
by his Attorneys
Howsen and Sons

UNITED STATES PATENT OFFICE.

HOWARD IRELAND, OF CAMDEN, NEW JERSEY.

FOOD-HOLDER FOR BIRD-CAGES.

SPECIFICATION forming part of Letters Patent No. 270,071, dated January 2, 1883.

Application filed October 9, 1882. (No model.)

*To all whom it may concern:*

Be it known that I, HOWARD IRELAND, a citizen of the United States, and a resident of Camden, New Jersey, have invented an Improvement in Food-Holders for Bird-Cages, of which the following is a specification.

The object of my invention is to provide a means of properly supporting in a bird-cage the friable cakes of composition with which the birds are sometimes furnished; and this object I attain by providing each cake with a holder provided at the back with lips adapted to the bars of the cage, as described hereinafter.

Figure 2:
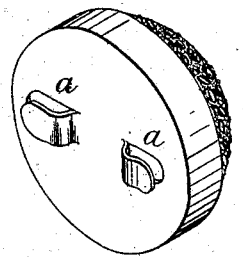
Figure 1:
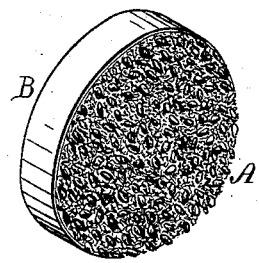

In the accompanying drawings, Figure 1 is a perspective view of a cake of bird-food with the case for holding the same; Fig. 2, a perspective view of the rear of Fig. 1, and Fig. 3 a view illustrating the means of attaching the case to a cage.

Cakes of bird-food consisting of a composition of various ingredients—such as saccharine matters, seeds, cayenne-pepper, &c.—have been made; but difficulty has been experienced in properly supporting such cakes of food in the cage, the cakes, when dry, being of a friable character.

Figure 3:
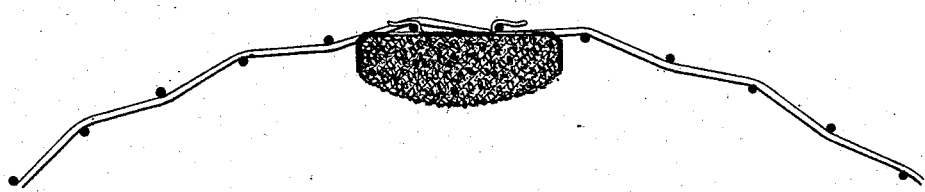

I combine with the cake a case or holder, B, which consists of a small dish or cup of tinned plate, having at the back lips $a\ a$, by which the holder may be retained on the bars of the cage, as shown in Fig. 3. The composition is packed into the holder while in a plastic condition, and afterward allowed to become dry and friable; or the cake may be first molded into shape, and when dry may be applied to the holder and secured therein by any suitable cement.

I claim as my invention—

The combination of a cake of bird-food with a holding-case provided at the back with lips by which the said case can be attached to the bars of a cage, as set forth.

In testimony whereof I have signed my name to this specification in the presence of two subscribing witnesses.

HOWARD IRELAND.

Witnesses:
HARRY DRURY,
HARRY SMITH.